(12) United States Patent
Rizkin et al.

(10) Patent No.: US 6,899,443 B2
(45) Date of Patent: May 31, 2005

(54) LIGHT MODULE

(75) Inventors: Alexander Rizkin, Redondo Beach, CA (US); Robert H Tudhope, Rancho Palos Verdes, CA (US)

(73) Assignee: Farlight LLC, Wilmington, CA (US)

( * ) Notice: Subject to any disclaimer, the term of this patent is extended or adjusted under 35 U.S.C. 154(b) by 0 days.

(21) Appl. No.: 10/408,923

(22) Filed: Apr. 8, 2003

(65) Prior Publication Data

US 2003/0189832 A1 Oct. 9, 2003

Related U.S. Application Data

(63) Continuation-in-part of application No. 09/566,521, filed on May 8, 2000, now Pat. No. 6,543,911.

(51) Int. Cl.[7] ................................................. F21V 5/00
(52) U.S. Cl. ........................ 362/327; 362/302; 362/307; 362/800
(58) Field of Search ................................. 362/326–329, 362/347, 348, 800, 299, 303, 305

(56) References Cited

U.S. PATENT DOCUMENTS

| | | | | |
|---|---|---|---|---|
| 2,215,900 A | * | 9/1940 | Bitner | 362/309 |
| 5,775,792 A | * | 7/1998 | Wiese | 362/328 |
| 6,097,549 A | * | 8/2000 | Jenkins et al. | 359/726 |

* cited by examiner

Primary Examiner—Sandra O'Shea
Assistant Examiner—Ali Alavi
(74) Attorney, Agent, or Firm—Gehrke & Associates, S.C.; Lisa A. Brzycki (57) ABSTRACT

A light module includes a light source and a reflective light transformer. The light source emits light with a limited angle omnidirectionally in a plane perpendicular to a light source optical axis. The reflective light transformer is located around the light source, and collects most of the light emitted by the light source and redirects and redistributes the collected light in a direction parallel to the light source optical axis. The light transformer includes a reflective surface with a precalculated arbitrary profile that transforms a light source spatial light distribution into a specific pattern with a generally different angular spread in a horizontal plane and a vertical plane.

11 Claims, 7 Drawing Sheets

LIGHT MODULE

CROSS-REFERENCE TO RELATED APPLICATIONS

This application is a continuation-in-part application of U.S. Ser. No. 09/566,521 filed May 8, 2000, and now U.S. Pat. No. 6,543,911.

BACKGROUND OF THE INVENTION

1. Field of the Invention

The present invention relates generally to illumination and signal lighting. In particular, the present invention relates to directional light sources (e.g., lamps) such as a parabolic aluminum reflector (PAR) type, metallized reflector (MR) type and the like. The present invention is specifically directed to light transforming devices that provide a precisely determined light distribution pattern, such as those used for aircraft approaches, landing and navigation.

2. Discussion of the Related Art

Most conventional light sources (incandescent, halogen, fluorescent, high discharge, high pressure, etc.) by their nature are almost omnidirectional sources in that they emit light in all directions.

For applications that require light distribution in limited angles or areas, conventional light sources are typically used in combination with reflectors that collect and direct the light generated by the source.

In applications such as precision technical lights, specifications call for complicated light distribution in both the horizontal and vertical planes. For example, the International Civil Aeronautical Organization (ICAO) requirement for threshold lighting, installed in the touch-down zone on a runway, includes the following specification: intensity minimum average 10,000 candelas in an area limited by ±5.5 degrees in the horizontal and from 1 to 10 degrees in the vertical; intensity minimum 1,000 candelas in an area limited by ±7.5 degrees in the horizontal and from 1 to 14 degrees in the vertical; and intensity minimum 500 candelas in an area limited by ±9 degrees in the horizontal and from 0 to 14 degrees in the vertical.

Figure 1:
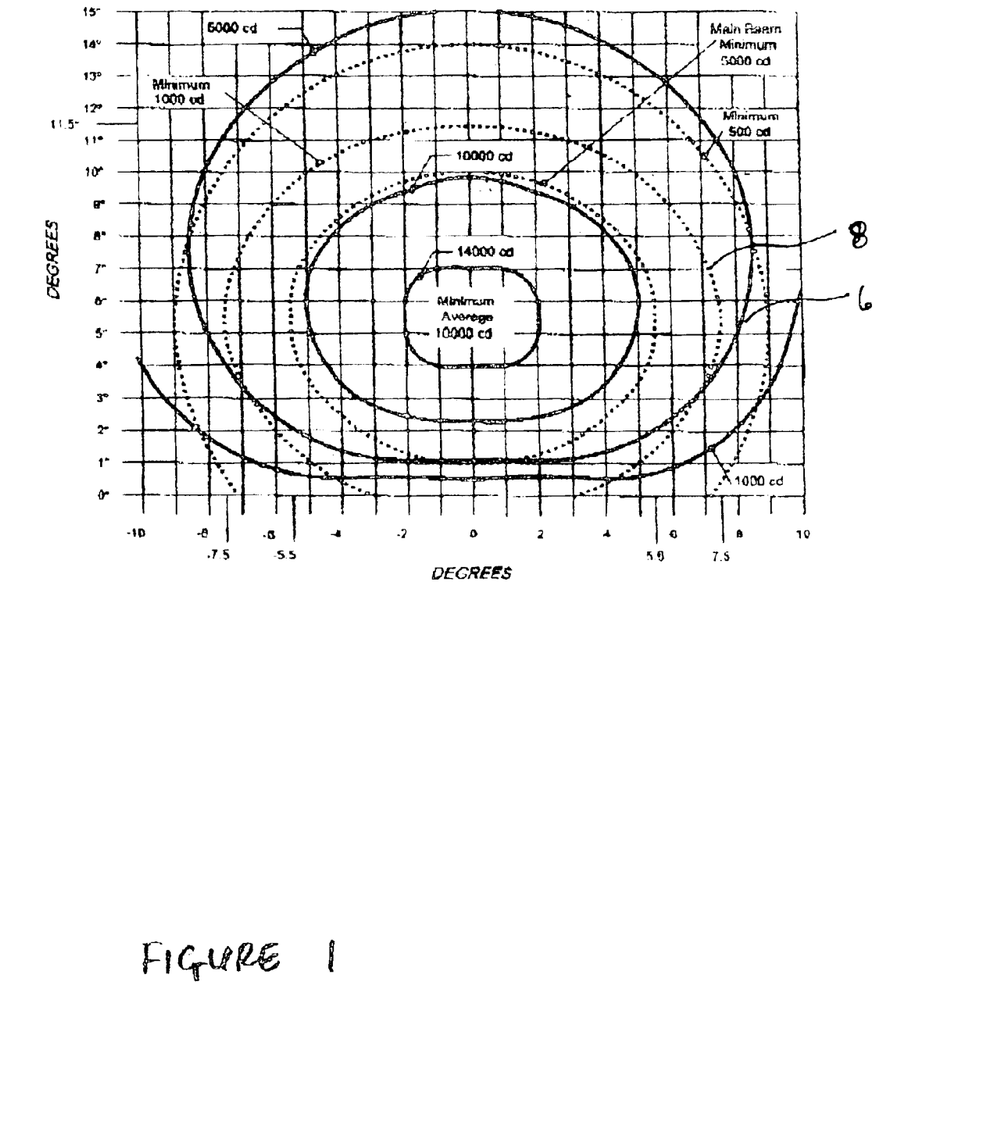
FIG. 1 is a diagram of the specification and actual intensity distribution performance for an airfield threshold luminaire based on conventional light sources and conventional optics.

Fulfilling this specification using conventional light sources in combination with conventional optical designs results in illumination that exceeds the specification requirements by several times, thereby providing the user with a high power consumption system that is very inefficient (see FIG. 1).

A new generation of lighting devices is based on solid state technology. In addition to other benefits, light emitting diodes (LEDs) have higher efficiency in that they produce more light per watt and they have an extremely long life. Recent advances have taken place in the area of directional LED lamp construction.

One of the basic categories of LED lamp construction is the implementation of multiple LEDs in a cluster to combine luminous flux from multiple LEDs using primary optics integrated in the LED for directionality, in addition to so-called "side-emitting" LEDs with relatively narrow omnidirectional patterns.

The other basic category of construction of LED lamp design is based on the use of an additional optical element (a "secondary optic") to concentrate and direct the light (e.g., the implementation of a refractive lens, using a reflector as a secondary optic, etc.).

Unfortunately, none of the current designs based on the use of LEDs in combination with conventional optics (refractive or reflective) provides high efficiency performance because almost all conventional optic designs are based on the "point source" concept with the assumption that the light source has a negligible physical size which is work for low power LEDs typically having a lighting body tens to hundreds of microns.

With the tendency of the LED technology to reach high power, the physical size of the LED chips are becoming much larger. For example, Lumelid's Luxeon Star™ 1 watt LED has a chip that is 0.5×0.5 mm and Luxeon Star™ 5 watt is $2.0 \times 2.0$ mm$^2$. Increasing light source size with the use of conventional optics creates a sufficient aberration, resulting in large losses and low efficiency.

What is needed, therefore, to overcome these limitations found in conventional systems is the application of solid-state technology (e.g., light emitting diodes) using nonimaging optics (NIO) as a secondary optic for precision spatial light distribution.

SUMMARY OF THE INVENTION

The present invention includes a light module having a light source and a light transformer. The light source emits light with a limited angle omnidirectionally in a plane perpendicular to a light source optical axis. The reflective light transformer is located around the light source, and collects most of the light emitted by the light source and redirects and redistributes the collected light in a direction parallel to the light source optical axis. The light transformer includes a reflective surface with a precalculated arbitrary profile that transforms a light source spatial light distribution into a specific pattern with a generally different angular spread in a horizontal plane and a vertical plane.

According to another aspect of the invention, an optical transformer includes a first end, a second end, a first member and a second member. The first end receives light from a light source and is located in a plane perpendicular to an optical axis corresponding to the transformer. The second end outputs the received light and is located on an opposite end of the transformer from the first end. The first member is located inside the transformer around the optical axis between the first end and the second end, and has an internal wall including a total internal reflection surface that redirects the received light in a direction perpendicular to the optical axis in an omnidirectional pattern. The second member is located coaxially around the first member between the first end and the second end, and has an outer wall including a total internal reflection surface that redirects and redistributes the light reflected from the first member in a direction of the second end and outside the transformer corresponding to a specific pattern with a generally different angular spread in a horizontal plane and a vertical plane.

According to yet another aspect of the invention, a light module includes a light source that emits light with a wide divergency, an optical transformer and a bolder. The optical transformer includes a first end that receives light from a light source, wherein the first end is located in a plane perpendicular to an optical axis corresponding to the transformer, a second end that outputs the received light, wherein the second end is located on an opposite end of the transformer from the first end, a first member located inside the transformer around the optical axis between the first end and the second end, wherein the first member has an internal wall including a total internal reflection surface that redirects the received light in a direction perpendicular to the optical axis in an omnidirectional pattern, and a second member located coaxially around the first member between the first end and the second end, wherein the second member has an outer wall including a total internal reflection surface that redirects and redistributes the light reflected from the first member in a direction of the second end and outside the transformer corresponding to a specific pattern with a generally different angular spread in a horizontal plane and a vertical plane. The holder secures the light source and mounts the light transformer.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

DETAILED DESCRIPTION OF THE PREFERRED EMBODIMENTS

Referring now to FIG. 1, the actual intensity distribution performance for an airfield threshold luminaire based on conventional light sources and conventional optics is illustrated with a solid line 6, while the specification requirement is illustrated with a dotted line 8. Given the gap between solid line 6 and dotted line 8, conventional optical systems are inefficient and result in high power consumption systems.

Figure 2:
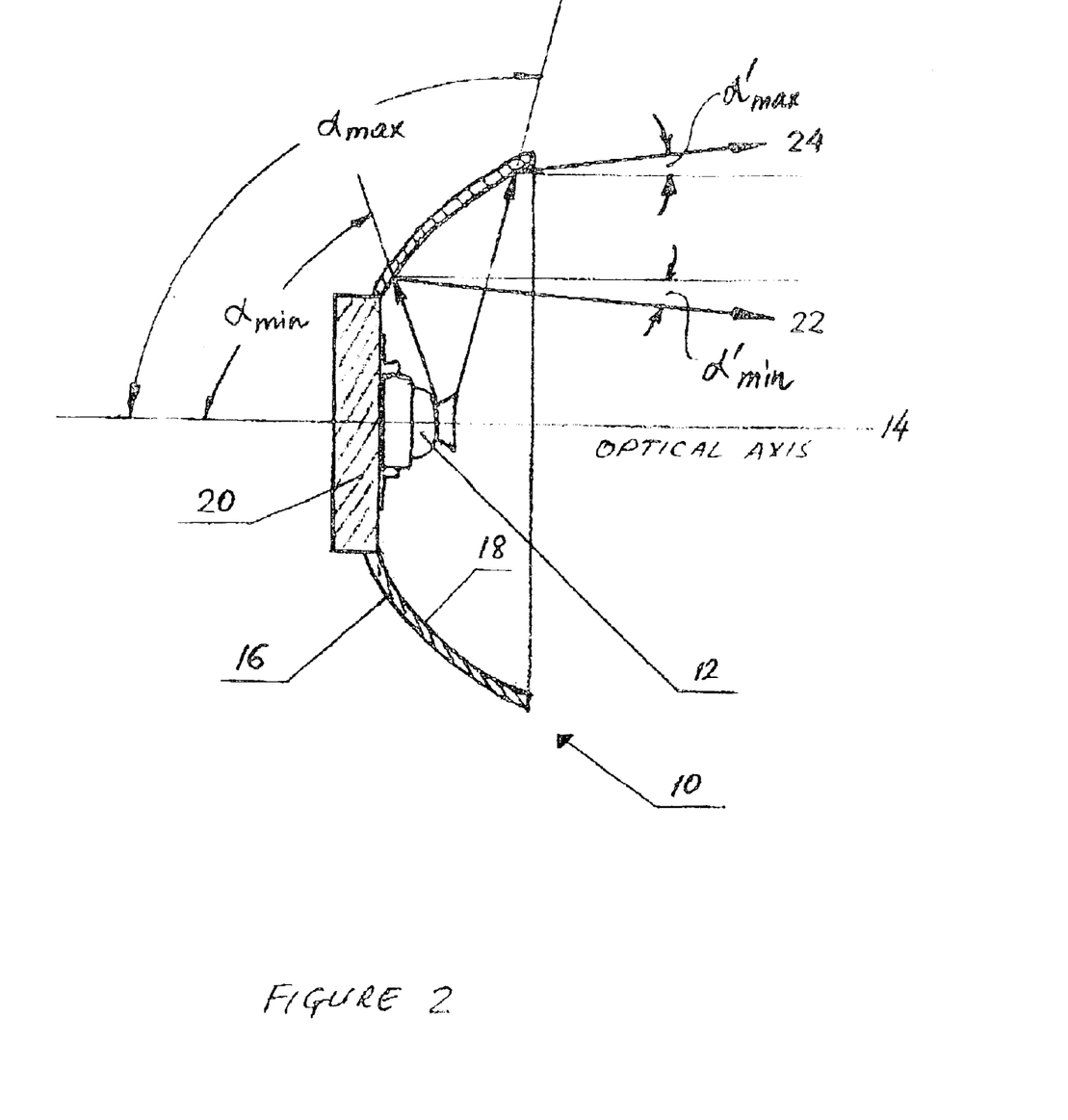
FIG. 2 is a cross-sectional view of a light module according to the present invention.

As illustrated in FIG. 2, a light module 10 includes a single light source 12 that emits light with a limited angle omnidirectionally in the plane perpendicular to an optical axis 14, a reflective light transformer 16, and a holder 20 for securing light source 12 and mounting light transformer 16.

Reflective light transformer 16 is located around light source 12 and collects most of the light emitted by light source 12 and redirects the collected light in the direction parallel to light source 12's optical axis 14, by using a reflective surface 18 with an arbitrary profile precalculated to transform the given light source 12 spatial light distribution into a required specific pattern.

In operation, light source 12 emits light in a limited angle ($\alpha_{min}$ to $\alpha_{max}$) omnidirectionally in the plane perpendicular to optical axis 14 with intensity distribution $I(\alpha)$. Each ray emitted by light source 12 is reflected from surface 18 in accordance with the local curvature of the profile of surface 18. For example, a ray 22 is reflected in the direction $\alpha'_{min}$ relative to optical axis 14, and a ray 24 is reflected in a direction $\alpha'_{max}$ relative to optical axis 14 creating outgoing light distribution in the angular domain ($\alpha'_{min} \div \alpha'_{max}$).

Intensity distribution $I(\alpha')$ across this domain is a function of reflected light redirection (e.g., reflective surface 18 profiling and light source 12 light distribution $I(\alpha)$.

$$I(\alpha')=F\{I(\alpha)\}, \tag{1}$$

where $I(\alpha')$ is the intensity distribution of the outgoing light;

$I(\alpha')$ is the given intensity distribution of light source 12; and $F\{\ \}$ is an arbitrary functional, which describes the profile of reflective surface 18.

Generally, assuming axis-symmetrical light source intensity distribution and two-dimensional intensity distribution for outgoing light (different in horizontal plane and vertical plane):

$$I(\alpha',\beta')=F\{I(\alpha)\} \tag{2}$$

where $I(\alpha',\beta')$ is two-dimensional intensity distribution of outgoing light.

Figure 3:
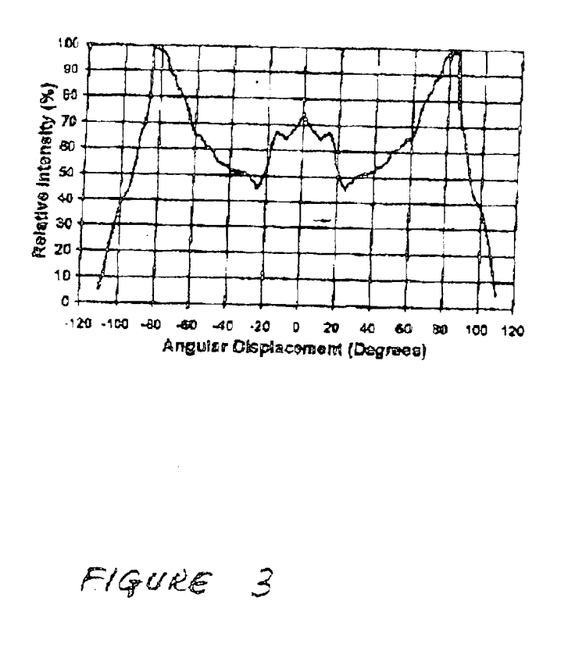
FIG. 3 is a graph of the angular intensity distribution for a side-emitting light source according to the present invention.
Figure 4:
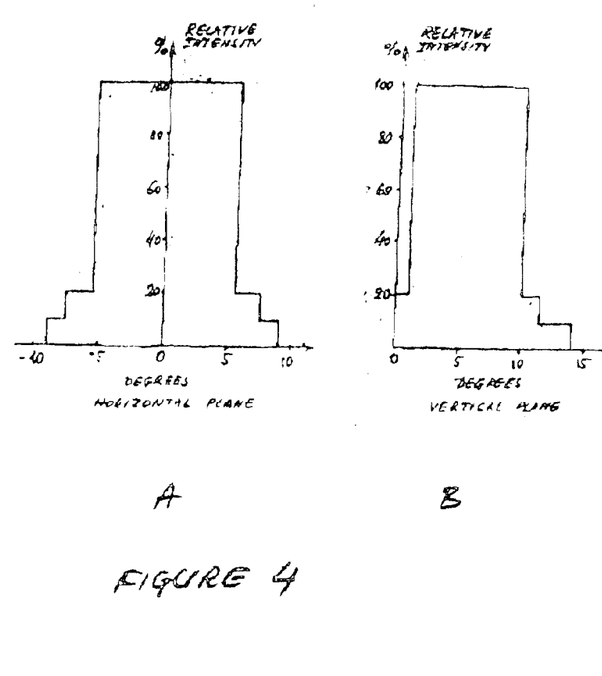
FIG. 4 is a graph of the spatial intensity distribution for a specific pattern (e.g., airfield threshold light) with a different angular spread in the horizontal plane (A) and vertical plane (B) according to the present invention.

For example, to provide airfield threshold light intensity distribution with a specific pattern as illustrated in FIG. 1 using a side-emitting Lumeled Luxeon Star™ LED (5 watts) (LXHL-FM5C) as a light source, it is necessary to design a light transformer with a reflective surface profile which will transform the light source light distribution (FIG. 3) into a required pattern (FIG. 4).

The design of the reflective surface is an iterative process, including the following steps:

1. Receiving maximum and minimum output angles;

2. Receiving a location of a portion of the light transformer's surface with respect to a light source that provides light; and 3. Iteratively point-by-point calculating an optical transformer reflective surface by providing an associated increment for an output angle for each increment of an input angle, the associated increment for the output angle being consistent with a predetermined output intensity distribution to reflect light provided by the light source according to the received maximum and minimum output angles based on the received location of a portion of the light transformer surface.

Figure 5:
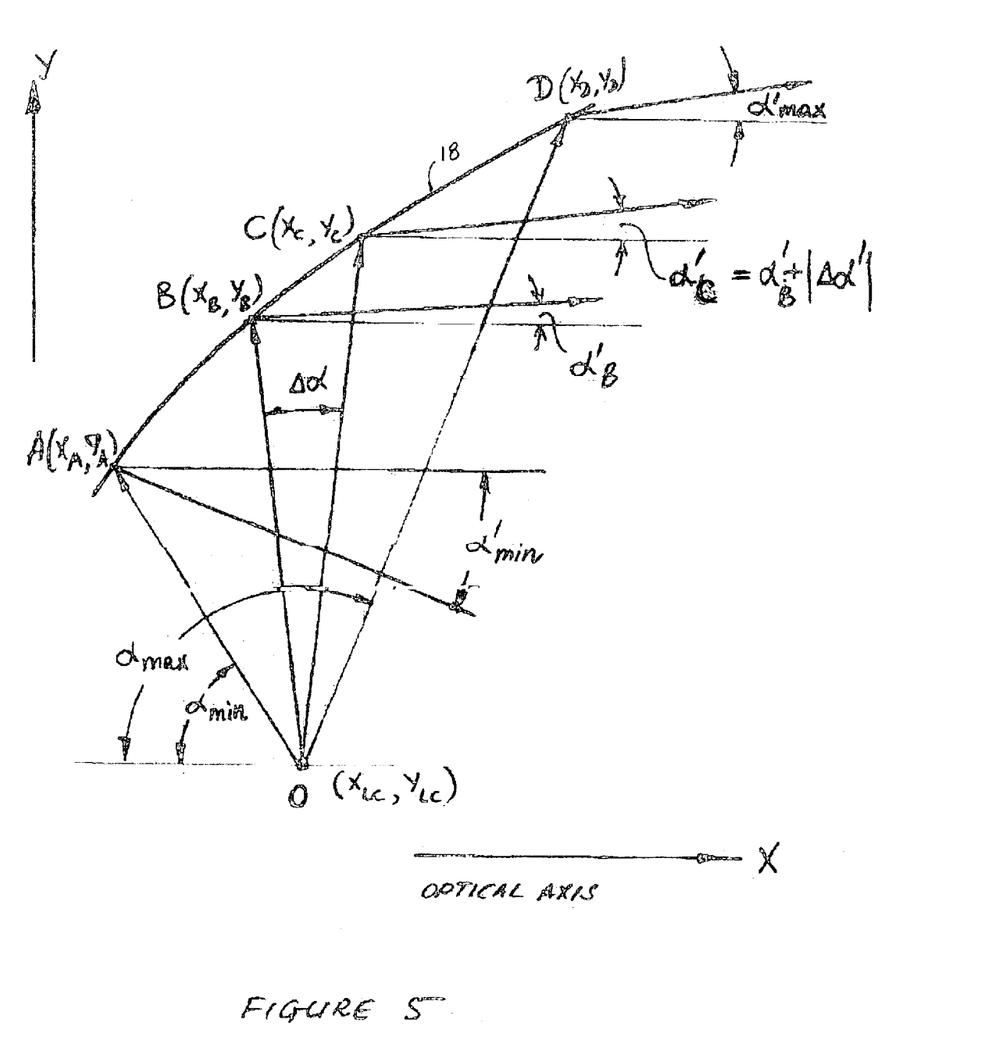
FIG. 5 is a diagram of a reflective surface profile according to the present invention.

FIG. 5 illustrates the design of a reflective surface profile according to the preferred embodiment of the present invention. Light source 12 with a given spatial intensity distribution $I(\alpha)$ is located in point O with coordinates ($x_{LC}$, $y_{LC}$), where x is optical axis, and the y axis is orthogonal to x. The ray from light source 12 with the minimal angle $\alpha_{min}$ is reflected from the point $A(x_A, y_A)$ of reflective surface ABCD in the direction $\alpha'_{min}$. The ray with the maximum angle $\alpha'_{max}$ is reflected from the point $D(x_D, y_D)$ of reflective surface ABCD in the direction $\alpha'_{max}$.

Angles $\alpha_{min}$ and $\alpha_{max}$ and intensity distribution $I(\alpha)$ are given, the light source location $O(x_{LC}, y_{LC})$ is determined, and the point $A(x_A, y_A)$ and the point $D(x_D, y_D)$ are fixed.

Assume any arbitrary point $B(x_B, y_B)$ on reflective surface 18 reflects the ray emitted by the source on angle $\alpha_{min} < \alpha_B < \alpha_{max}$ in an output direction $\alpha'_{min} < \alpha'_B < \alpha'_{max}$. The next point on reflective surface 18, $C(x_C, y_C)$, is determined by providing an increment $\Delta\alpha$ of an input angle, with an associated increment $\Delta\alpha'$ of an output angle being consistent with a predetermined output intensity distribution $I(\alpha')$, so that:

$$\alpha'_C = \alpha'_B + |\Delta\alpha'| \qquad (3)$$

Based on the preferred embodiment of the present invention, point $C(x_C, y_C)$ is found from the condition that output energy in sector $\Delta\alpha'$ is equal to the emitted energy in the sector $\Delta\alpha$ with the factor a:

$$a \int_{\alpha_{min}}^{\alpha_{max}} f(\alpha) \cdot d\alpha = \int_{\alpha'_{min}}^{\alpha'_{max}} f'(\alpha') \cdot d\alpha' \qquad (4)$$

and $$a = \frac{f'(\alpha') \cdot \Delta\alpha'}{f(\alpha) \cdot \Delta\alpha} \qquad (5)$$

where
 $f'(\alpha')$ is the power function related to the transformational functional $F\{\ \}$.

Figure 6:
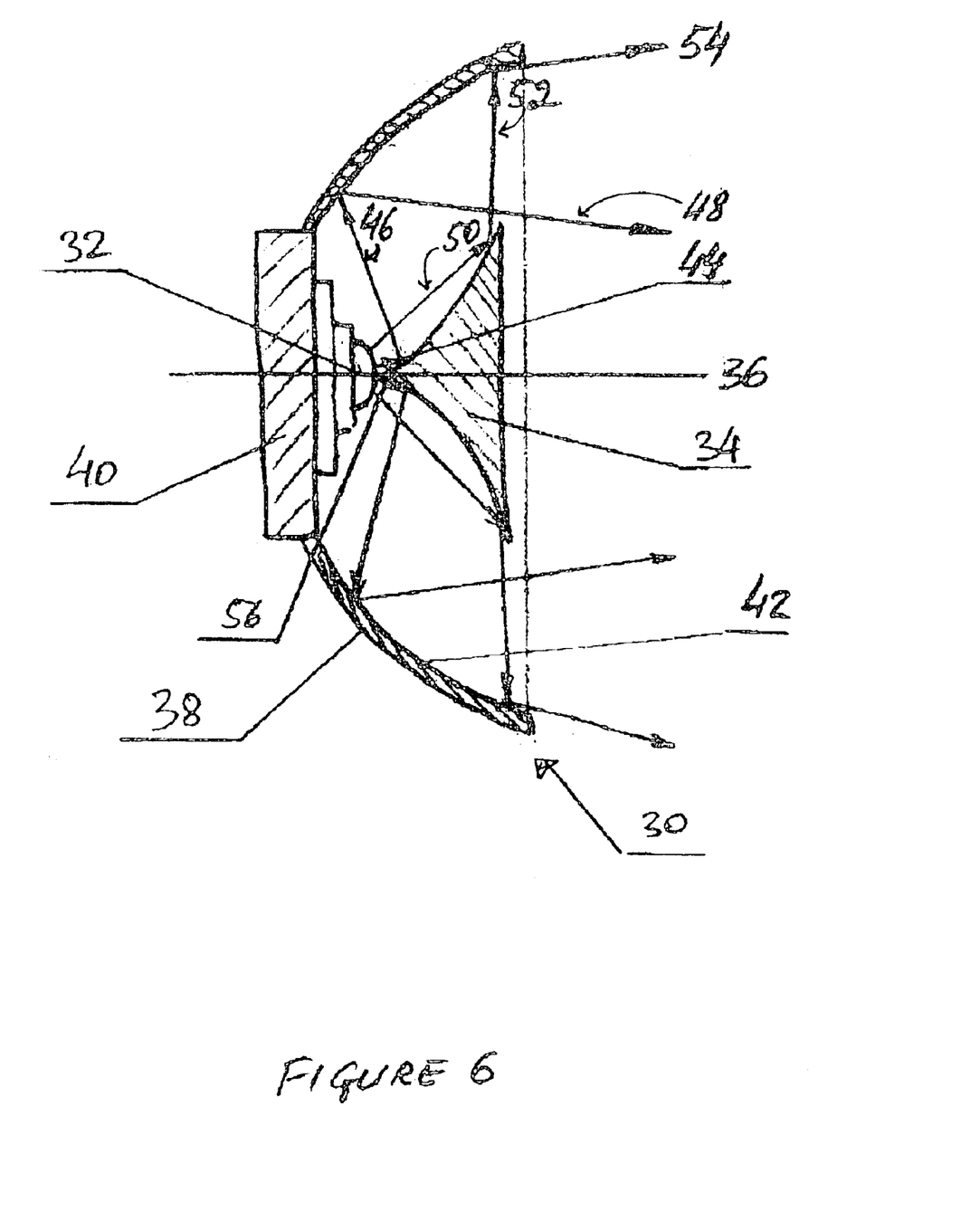
FIG. 6 is a cross-sectional view of a light module including a light source having a LED in combination with a secondary optic that provides an omnidirectional pattern according to the present invention.

Factor a will be determined unambiguously by the boundary condition $\alpha_{min}$ and $\alpha_{max}$. This procedure is repeated from point C to the new point on reflective surface 18 until the outgoing angle $\alpha'$ does not reach $\alpha'_{max}$ in point $D(x_D, y_D)$ Based on an alternative embodiment of the present invention, FIG. 6 illustrates a light module 30 that includes a single light source 32 that emits the light with a wide angle divergency, a secondary optic 34 (e.g., a reflective curved cone) which redirects the light emitted by light source 32 omnidirectionally in the plane perpendicular to a light source optical axis 36, a reflective light transformer 38, and a holder 40 for securing light source 32 and secondary optic 34, and mounting light transformer 38.

A reflective cone apex 56 is located on optical axis 36 adjacent to light source 32. Light transformer 38 is located around light source 32 and secondary optic 34.

In operation, light emitted by light source 32 with wide divergency is reflected by secondary optic element 34 omnidirectionally in the direction of reflective light transformer 38, and reflected again by light transformer 38 reflective surface 42 in the direction parallel to light source optical axis 36.

For example, a light ray 44 emitted from light source 32 is reflected from secondary optic element 34 as a ray 46, and after being reflected from light transformer reflective surface 42, ray 46 is directed as a ray 48 outside light module 30. Similarly, a ray 50 is reflected from secondary optic element 34 as a ray 52 and then reflected from light transformer reflective surface 42 as ray a 54 outside light module 30.

For a given light source intensity distribution in a sector limited by a minimal angle (ray 44) and a maximal angle (ray 50), the outgoing light in a sector limited by rays 48 and 54 is a function of two transformations: by secondary optic element 34 and by reflective light transformer 38.

The principles and methods for the arbitrary reflective surface design according to the alternative embodiment of the present invention described above are applicable to design both the secondary optic and the reflective light transformer which are integrated into this alternative embodiment illustrated in FIG. 6.

Figure 7:
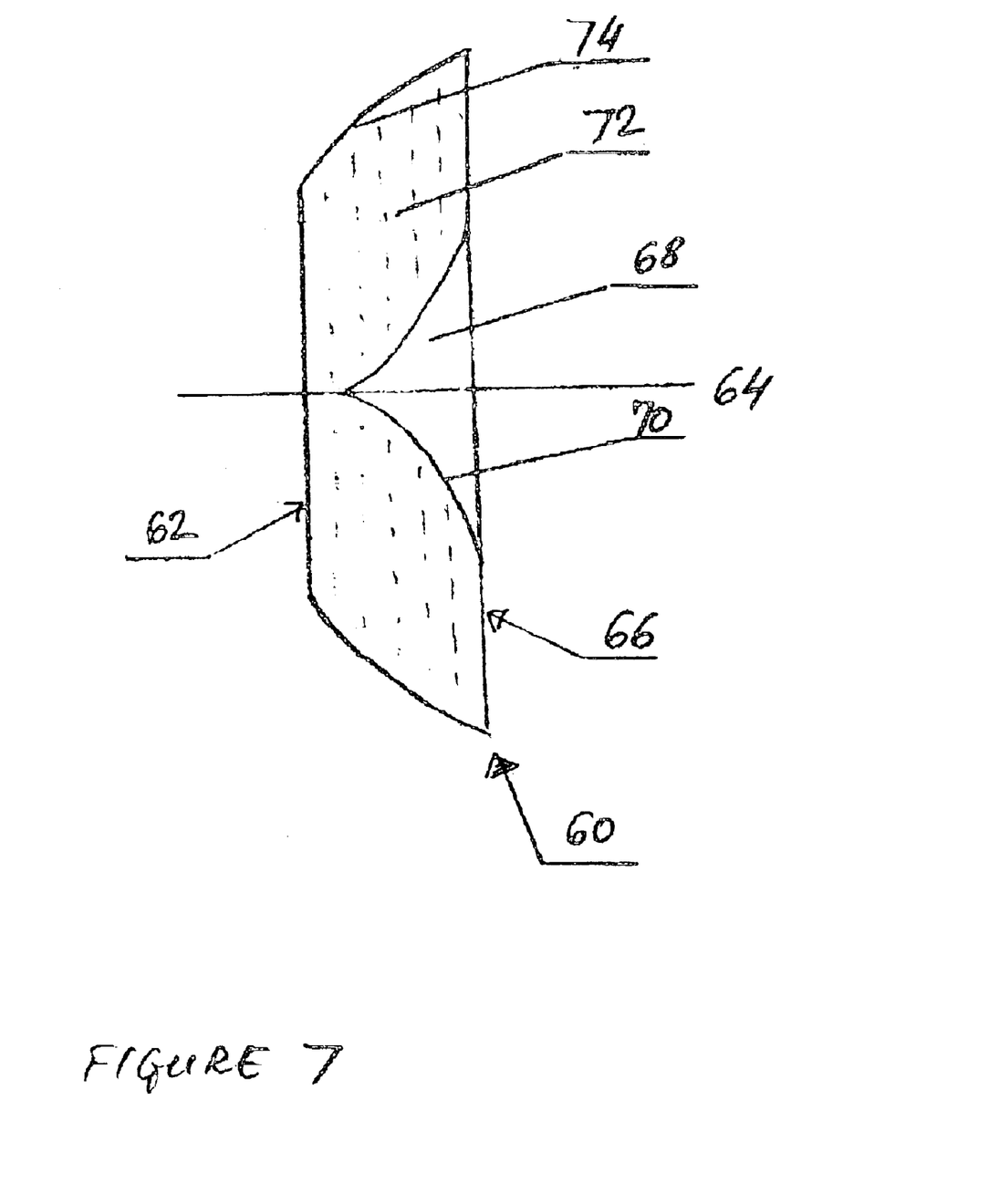
FIG. 7 is a cross-sectional view of an optical transformer according to another embodiment of the present invention.

Referring now to FIG. 7, an optical transformer 60 includes a first end 62, located in a plane perpendicular to an optical transformer axis 64, a second end 66 located on an opposite end of the device from first end 62, and is also in the plane perpendicular to transformer axis 64, a first member 68 located inside transformer 60 around optical axis 64 between first end 62 and second end 66, first member 68 having an internal wall including a total internal reflection (TIR) surface 70, and a second member 72 located coaxially around first member 68 between first end 62 and second end 66, second member 72 having an outer wall including a total internal reflection (TIR) surface 74.

In operation, first end 62 receives and collects the light from an outside light source (not shown) in the direction of first member 68. First member 68's reflection surface 70 redirects the light with high efficiency by means of total internal reflection in an omnidirectional pattern perpendicular to transformer optical axis 64.

Total internal reflection (TIR) surface 74 of the second member 72 redirects and redistributes the light reflected from first member 68 in a direction of second end 66 and outside optical transformer 60. In the present invention, total internal reflection (TIR) surface 70 of first member 68 and total internal reflection (TIR) surface 74 of second member 72 are designed based on the given light source spatial intensity distribution in accordance with a required specific pattern of outgoing light with generally different angular spread in the horizontal plane and the vertical plane.

Optical transformer 60 illustrated in the present invention is preferably fabricated from transparent material such as glass, acrylic, and polycarbonate, by diamond turning, injection molding or hot pressing.

Total internal reflection surfaces 70 and 74 are calculated and designed as described above for light transformer 60 with a particular reflective surface taking into account the given material's index of refraction. Therefore, surfaces 70 and 74 are calculated and designed based on:

1. Receiving maximum and minimum output angles;
2. Receiving a location of a portion of the light transformer surface with respect to a light source that provides light; and
3. Iteratively point-by-point calculating an optical transformer reflective surface by providing an associated increment for an output angle for each increment of an input angle, the associated increment for the output angle being consistent with a predetermined output intensity distribution to reflect light provided by the light source according to the received maximum and minimum output angles based on the received location of a portion of the light transformer surface.

Figure 8:
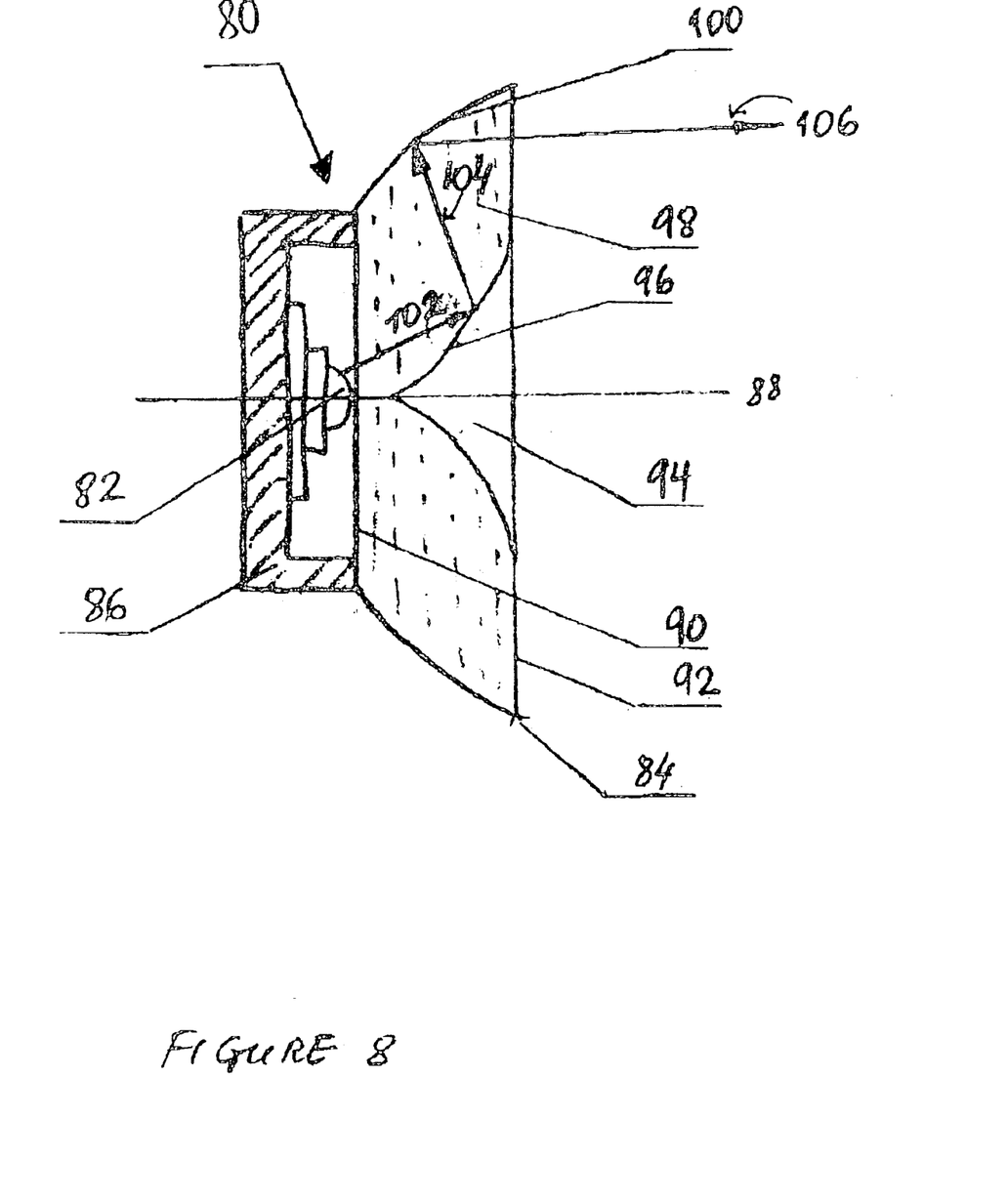
FIG. 8 is a cross-sectional view of a light module according to another embodiment of the present invention.

Referring now to FIG. 8, a light module 80 includes a single light source 82, an optical transformer 84 and a holder 86. A light source optical axis 88 is coincidental with light transformer axis. Optical transformer 84 includes a first end 90 located in the plane perpendicular to optical axis 88 and a precalculated distance away from light source 82, a second end 92 located also in the plane perpendicular to optical axis 88, a first member 94 with an inner total internal reflection (TIR) surface 96, and a second member 98 with an outer total internal reflection (TIR) surface 100.

Both internal reflection surfaces 96 and 100 have a mutually precalculated profile, based on given light source spatial intensity distribution, required intensity distribution across outgoing light specific pattern, and design parameters such as the material index of refraction and distance between light source 82 and transformer's first end 90.

In operation, light emitted by light source 82 passes through optical transformer first end 90 as, for example, a ray 102, reflected from first member total internal surface 96 in an omnidirectional pattern directed generally perpendicular to optical axis 88 as a ray 104, and reflected again from second member total internal reflection surface 100 as a ray 106 in the direction generally parallel to optical axis 88, passing second end 92 outside light module 80.

The scope of the application is not to be limited by the description of the preferred embodiments described above, but is to be limited solely by the scope of the claims that follow. For example, LEDs can be replaced by an array of laser diodes or the LEDs can be substituted by plasma light sources with primary optics (e.g., a fusion light) without departing from the scope of the preferred embodiment of the present invention.

What is claimed is:

1. A light module comprising:
a light source that emits light with a limited angle omnidirectionally above and below a plane perpendicular to a light source optical axis; and
a reflective light transformer located around the light source, wherein the light transformer collects most of the light emitted by the light source with high efficiency and redirects and redistributes the collected light into a predetermined pattern with a generally different angular spread across orthogonal coordinates and in a direction parallel to the light source optical axis, wherein the light source optical axis is coaxial with a light transformer optical axis, and wherein the light transformer includes a reflective surface with a precalculated arbitrary profile that is calculated as an arbitrary function of both light source angular intensity distribution and the required pattern angular intensity distribution.

2. A light module of claim 1, further comprising:
a holder configured to secure the light source and mount the light transformer.

3. A light module of claim 1, wherein the light source is a side-emitting LED.

4. A light module of claim 1, wherein the light source comprises a LED in combination with a secondary optic, and provides an omnidirectional pattern distribution with a limited angle above and below a plane perpendicular to a LED optical axis.

5. A light module of claim 1, wherein the light transformer reflective surface utilizes total internal reflection.

6. A light module of claim 1, wherein the reflective light transformer transforms the light source spatial light distribution into the specific pattern with a symmetrical angular spread.

7. An optical transformer comprising:
a first end that receives light from a light source, wherein the first end is located in a plane perpendicular to an optical axis corresponding to the transformer;
a second end that outputs the received light, wherein the second end is located on an opposite end of the transformer from the first end;
a first member located inside the transformer around the optical axis between the first end and the second end, wherein the first member has an internal wall including a total internal reflection surface that redirects the received light in a direction perpendicular to the optical axis in an omnidirectional pattern with a limited angle above and below the plane perpendicular to the optical axis; and
a second member located coaxially around the first member between the first end and the second end, wherein the second member has an outer wall including a total internal reflection surface that redirects and redistributes the light reflected from the first member in a direction of the second end and outside the transformer corresponding to a specific predetermined pattern with a generally different angular spread across orthogonal coordinates.

8. An optical transformer of claim 7, wherein the second member redirects and redistributes the light reflected from the first member in a direction towards the second end and outside the transformer corresponding to the specific pattern with a symmetrical angular spread.

9. A light nodule comprising:
a light source that emits light with a wide divergency;
an optical transformer including
a first end that receives light from a light source, wherein the first end is located in a plane perpendicular to an optical axis corresponding to the transformer;
a second end that outputs the received light, wherein the second end is located on an opposite end of the transformer from the first end;
a first member located inside the transformer around the optical axis between the first end and the second end, wherein the first member has an internal wall including a total internal reflection surface that redirects the received light in a direction perpendicular to the optical axis in an omnidirectional pattern with limited angle above and below the plane perpendicular to the optical axis; and
a second member located coaxially around the first member between the first end and the second end, wherein the second member has an outer wall including a total internal reflection surface that redirects and redistributes the light reflected from the first member in a direction of the second end and outside the transformer corresponding to a specific predetermined pattern with a generally different angular spread across orthogonal coordinates; and
a holder for securing the light source and mounting the light transformer.

10. A light module of claim 9, wherein the light source is a LED.

11. A light module of claim 9, wherein the outer wall and inner wall reflection surfaces are calculated by the steps comprising:
receiving a maximum output angle and a minimum output angle;
receiving a location of a portion of the light transformer's surface with respect to the light source; and
iteratively point-by-point calculating the optical transformer reflective surface by providing an associated increment for an output angle for each increment of an input angle, the associated increment for the output angle being consistent with a predetermined output intensity distribution to reflect light provided by the light source according to the received maximum and minimum output angles based on the received location of a portion of the light transformer surface.

* * * * *